| [72] | Inventor | John H. King, Jr. |
| --- | --- | --- |
| | | Endwell, N.Y. |
| [21] | Appl. No. | 879,481 |
| [22] | Filed | Nov. 24, 1969 |
| [45] | Patented | Aug. 17, 1971 |
| [73] | Assignee | International Business Machines Corporation |
| | | Armonk, N.Y. |

[54] RECORDING AND REPLICATION OF ARRAYS OF HOLOGRAMS
1 Claim, 3 Drawing Figs.

[52] U.S. Cl. .................................................. 350/3.5, 355/2
[51] Int. Cl. ..................................................... G02b 27/00
[50] Field of Search ....................................... 350/3.5; 355/2

[56] References Cited
FOREIGN PATENTS
91,031   2/1968   France .................. 350/3.5

OTHER REFERENCES
Vitols, IBM Technical Disclosure Bulletin, Vol. 8, No. 11, April 1966 pp. 1581—1583

*Primary Examiner*—David Schonberg
*Assistant Examiner*—Ronald J. Stern
*Attorneys*—Hanifin and Jancin and Andrew Taras ABSTRACT: High fidelity holograms can be replicated in quantity from a master hologram constructed by side band techniques in which spatial filters are employed in both reference and object beams. A collimating lens provides a plane wave reference beam which interferes with a convergent object beam produced by a focusing lens at an image plane occupied by the master hologram, the object function being located either before or after the focusing lens. In the replication process, the master hologram containing a plurality of discrete holograms and the hologram plate on which replicas of the master are to be recorded are placed one on either side of the focusing lens and separated from the latter by equal distances. A reference beam is directed through the master, which yields a diffracted beam constituting the master image that passes through the focusing lens and interferes with a component reference beam to form interference patterns, characterized as different from those on the master holoarray, on the emulsion side of the plate, which when developed forms the replicated hologram.

INVENTOR.
JOHN H. KING JR.

RECORDING AND REPLICATION OF ARRAYS OF HOLOGRAMS

BACKGROUND OF THE INVENTION

The invention relates to the construction of a holoarray comprised of a plurality of discrete holograms, and to a simple but unique mechanism for replicating high-quality holograms from the master holoarray.

Techniques for duplicating holograms from a master have employed direct contact printing in which a "blank" is physically impressed against the master whereby a direct image transfer results. Other techniques have employed program plotting of so-called phase or amplitude holograms under control of a computer. The above techniques suffer from undue complexities and high costs with less than satisfactory results. Yet other techniques have employed conventional holographic techniques which yield duplicated holograms of low efficiencies.

The present invention not only overcomes the above disadvantages, but enables the replication of high-quality holograms on a large scale at low costs.

OBJECTS

The principal object of the invention is to provide a simple and economical means for replicating high fidelity holograms in large quantity from a master hologram.

Another object is to provide a means for replicating a holoarray of small aperture high fidelity holograms with diffraction efficiencies as high as that yielded by holograms recorded directly.

Yet another object is to provide novel means for replicating holograms from a master hologram constructed in a unique manner.

The foregoing and other objects, features and advantages of the invention will be apparent from the following more particular description of preferred embodiments of the invention, as illustrated in the accompanying drawings.

DESCRIPTION OF THE DRAWINGS

Referring to FIG. 1, the side band construction technique for developing a single master hologram comprises a source 1 which may be a laser that issues a coherent beam of radiation 2 which is divided, by means of a beam splitter 3, into component object and reference beams $2a$, $2b$. The object component beam $2a$ is directed, by means of a mirror 4 through converging lenses 5 and 6, onto the focal plane of the latter lens where the focal point of lens 5 is imaged. This image field of the focal point of lens 5 is made to interfere with the reference component beam $2b'$ by means of mirrors 7 and 8, lens 9, spatial filter $9a$ and collimating lens 10. The reference beam component $2b'$ which emerges from the collimating lens 10 has a plane wave front. An object function such as a transparency is placed either before or after the converging lens 6 in the path of the object beam component and the object beam is made to interfere with the reference component beam and the resulting interference pattern are directed upon the emulsion side of the hologram plate 12, which plate lies in the focal plane of the lens 6. To enhance the characteristics of the hologram 12, spatial filters $5a$ and $9a$ are placed in the paths of the object and reference beam components $2a$, $2b$. The spatial filters provide more uniform illumination in both the reference and object beam components. The spatial filter $5a$ provides effectively a point source for illuminating the lens 6 which in turn provides the desired illumination of the object function 11. Spatial filter $9a$ provides effectively a point source of spatially coherent light which in conjunction with the lens 10 provides the plane wave reference beam component $2b'$.

When it is desired to construct a master holoarray containing a plurality of discrete holograms, the arrangement shown in FIG. 2 is utilized in which like reference characters relate to the corresponding elements shown in the arrangement of FIG. 1. Referring to FIG. 2, it will be observed that the component reference beams $2b$, $2b'$ are derived in a manner similar to that shown in the arrangement of FIG. 1. The structure for generating a component object beam is further modified by the provision of a rectilinear translating means, schematically represented. This translating means includes an opaque mask plate 14 having a small aperture $14a$ in front of which and affixed to said plate 14, is a lens 15 having a very short focal length. A second opaque mask plate 16, also having an aperture $16a$, is located to the left of the holoarray 12. Both of these mask plates 14, 16 along with a lens 15, have their motions constrained in planes parallel to each other and perpendicular to the optical axis of a converging lens 17 interposed between the mask plates 14, 16. This lens 17 is utilized to provide a focused object beam through the aperture $16a$. Lens $6'$ is positioned relative to the mask plate 14 in such a way as to provide a collimated component object beam $2a'$ of wide aperture. In the absence of an object function in the path of an object beam, the lens 17 will image point source $15'$ which is the focal point of the lens 15 as a diffraction limited spot in the image plane occupied by the holoarray 12. A lens of high quality having a correction for conjugate plane imaging of one-to-one magnification will yield a one-to-one correspondence between the coordinates of the point source $15'$ and its image on the holoarray 12 for the specified optical arrangement. Thus for each different discrete hologram recorded on the master holoarray 12, a unique spatial orientation is required of the arrangement controlling the positions of plates 14, 16 together with the lens 15. A distinct advantage of having a movable point source of light, such as that indicated $15'$, is that it virtually eliminates gradual variations in beam intensities which may exist at the output of the lens $6'$ and thereby provides uniform illumination for each discrete hologram recorded on the master holoarray 12. One requirement of the lens 17 is that it be substantially free of coma and spherical aberration within the field of focus of the object beam $2a'$.

Figure 3:
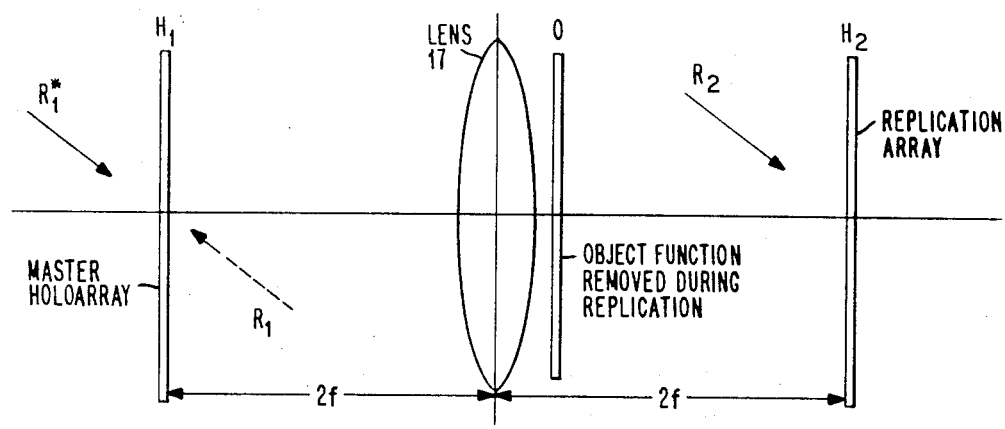
FIG. 3 is a schematic arrangement illustrating the manner of replicating holograms produced from a master constructed in accordance with the system shown in FIG. 2.

A schematic representation of the means for replicating a holoarray from a master holoarray containing a plurality of discrete holograms is shown in FIG. 3 to which reference is not invited.

Figure 1:
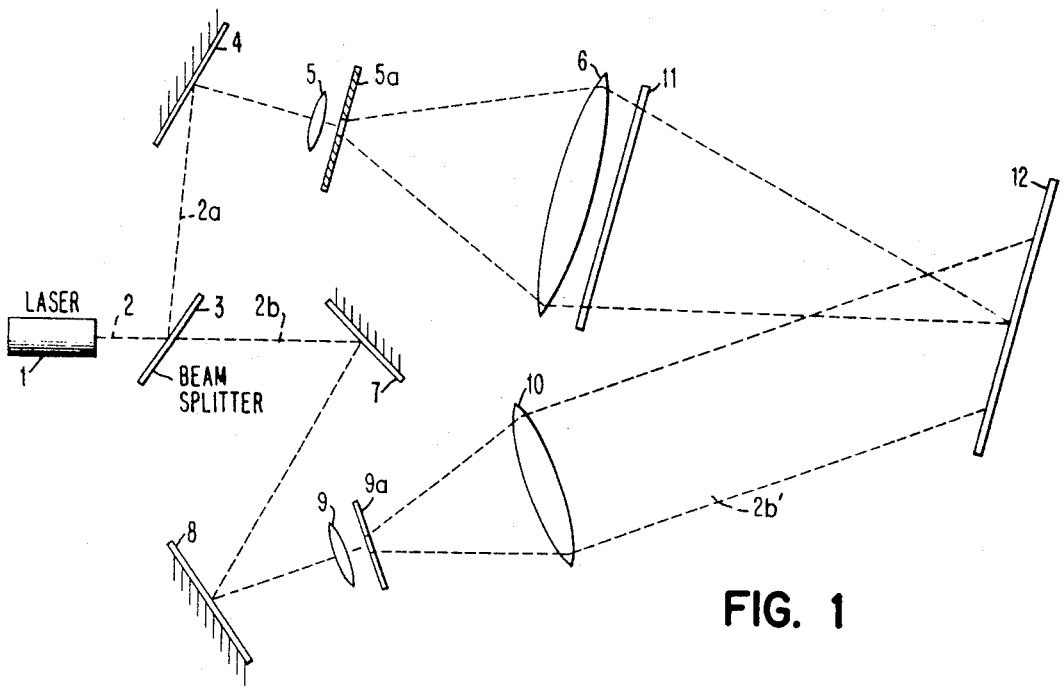
FIG. 1 shows a side band technique for constructing a single master hologram.
Figure 2:
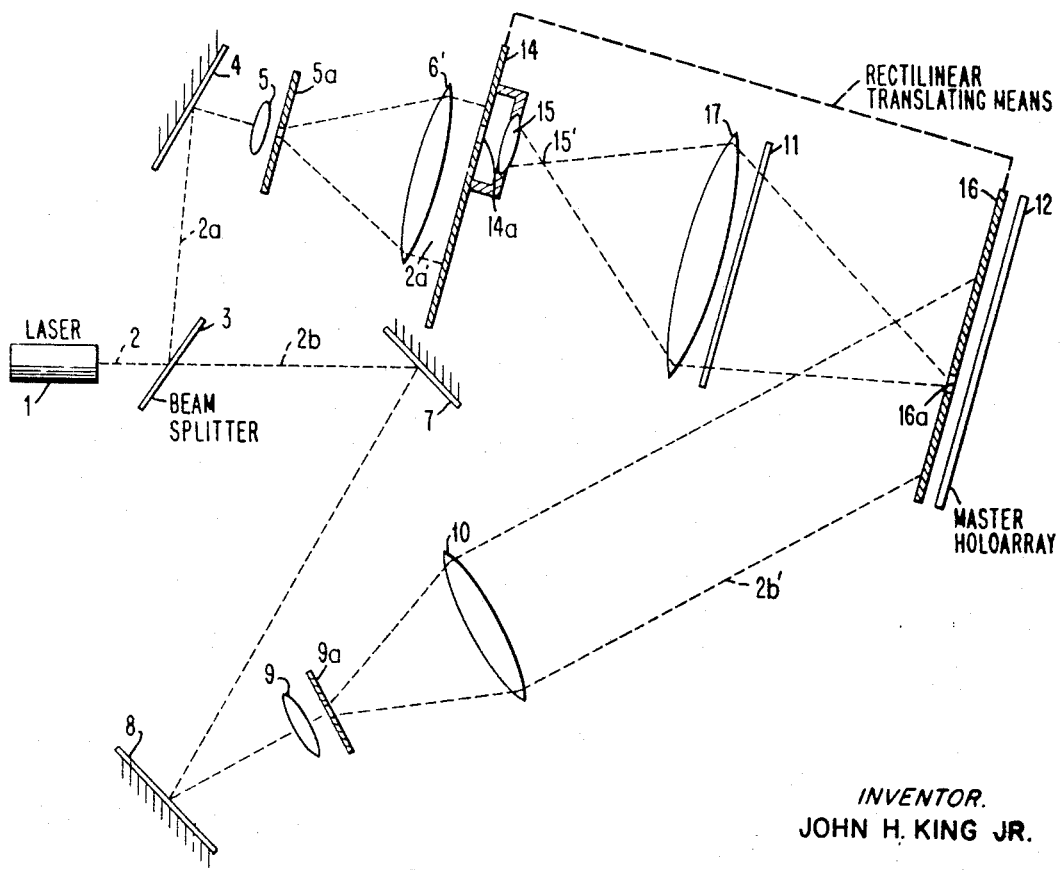
FIG. 2 is a holographic system employing side band techniques incorporating a rectilinear mask and light source translating system in the path of the object beam for constructing a master holoarray constituted of a multiplicity of discrete holograms.

During recording of the master holoarray, $H_2$ represents the plane of the movable point source $15'$, shown in FIG. 2, from which the object beam emanates; $H_1$, the emulsion side of the plate on which the master holoarray is recorded; O, the position assumed by the object functions; and $R_1$, the direction of the component reference beam impinging upon the master holoarray. This arrangement is very similar to that shown in FIG. 2 except for the position of the object function.

During replication, $H_2$ represents the emulsion plane upon which are imaged the interference pattern projected from the master holoarray; $H_1$, the position assumed by the master holoarray; $R_1^*$, the reference readout beam for the master holoarray; $R_2$, the component reference beam which interferes with the object beams, projected from the master holoarray, to form patterns, which are a replica of the master patterns, which are recorded on the replicated array and the object function represented by O is removed prior to the replication step. In the plane O are projected the superposition of the images from the master holoarray occupying the position $H_1$.

In the course of replication, the beams associated with the reconstructed images converge toward plane $H_2$, and if plane $H_2$ and $H_1$ are at the conjugate focal planes of the lens 17, the original object beam diffraction patterns at $H_1$ will be reproduced or "imaged" in plane $H_2$. When these beams at $H_2$ are interfered with the plane wave component reference beam $R_2$, an array of holograms will be simultaneously recorded on the emulsion side of the plate in plane $H_2$ (which, when developed, will lenslessly reconstruct the original object in plane O). Since any ratio of object to reference beam intensities at plane $H_2$ can be established by suitably attenuating either the reference beam $R_2$ or the object beams, the so-called replicated holograms recorded in plane $H_2$ can have just as high efficiencies as holograms recorded directly with the original object beams.

During replication the lens 17 images the total field associated with the object beams of the array of holograms in plane $H_1$. No interference between the originally different object fields can occur because there are no nonlinear optical elements involved in the replication process, i.e., lens 17 provides separate and distinct optical channels by virtue of the angular separation of the various object beams, and the lens being a linear medium, no interaction between the beams can occur. By this means the rapid replication of large arrays of holograms becomes a simple and economical process. This method represents a significant improvement over the so-called contact printing method of replicating holograms because the maximum efficiencies obtainable with contact printing are generally very low.

It was earlier herein mentioned that in the construction of the holoarray 12, and in accordance with the system in FIG. 2, the object function 11 may be placed on either side of the field lens 17 without explaining the distinction as to the effect on the character of the holograms recorded in the master holoarray 12. In order to appreciate the distinctions in the resulting interference patterns because of the position of the object function, it will be assumed that the object function is situated in the position shown in FIG. 2, namely to the right side of the lens 17. Under this condition the character of the interference patterns recorded on the array 12 are such that a lens will be needed in the reconstruction process, from the replicated array, to yield the image of the object function 11. However, when the object function 11 in FIG. 2 is placed on the left side of the lens 17, the character of the recorded interference patterns on the array 12 is such that the image of the object function will lenslessly reconstruct, from the replicated array, in view of the fact that the interference patterns are of a character which is different from that when the recordings were made with the object function to the right side of the lens 17.

While the invention has been particularly shown and described with reference to preferred embodiments thereof, it will be understood by those skilled in the art that the foregoing and other changes in form and details may be made therein.

What I claim is:

1. A system for replicating a master holoarray to produce holograms having a different interference pattern from the interference pattern of said master holoarray but containing substantially the same information wherein said master holoarray is originally formed by apparatus comprising a source of coherent light, a photosensitive plate for recording said holoarray, means for splitting said light into two collimated and mutually coherent beams, one of said beams being projected directly onto said plate as a reference beam, the other of said two beams being projected toward said plate along a path angularly displaced from said reference beam, a short focal length lens having an aperture substantially smaller than said other beam, said lens being positioned in said other beam and being moveable in a plane parallel to said photographic plate, a wide aperture positive lens for producing an image of the focal point of said short focal length lens on said plate at unity magnification, an object transparency being disposed adjacent said wide aperture lens, a mask disposed in front of said plate and having an aperture for blocking all light from reaching said plate except for that in a small area about said image of said focal point and rectilinear translating means for moving said mask and said short focal length lens in unison to provide a unique spatial location for said focal point and said aperture for each object transparency recorded, said replicating system comprising a wide aperture positive lens optically identical to that used in making said master holoarray, a second photosensitive plate disposed in the same plane relative to said lens as that containing the locus of possible locations for said focal point of said short focal length lens, said master holoarray being disposed in the same position relative to said positive lens as when said master was formed, means for illuminating said master as a whole with a collimated coherent beam of light in a direction opposite to that of the reference beam used in forming said master and means for illuminating said second photosensitive plate with a reference beam mutually coherent with said beam illuminating said master so as to form an interference pattern that is different from the corresponding pattern of said master.